(12) United States Patent
Nilsson

(10) Patent No.: US 11,293,536 B2
(45) Date of Patent: Apr. 5, 2022

(54) TORQUE VECTORING DEVICE

(71) Applicant: BorgWarner Sweden AB, Landskrona (SE)

(72) Inventor: Kristoffer Nilsson, Lund (SE)

(73) Assignee: BorgWarner Sweden AB, Landskrona (SE)

( * ) Notice: Subject to any disclaimer, the term of this patent is extended or adjusted under 35 U.S.C. 154(b) by 0 days.

(21) Appl. No.: 16/647,718

(22) PCT Filed: Sep. 21, 2018

(86) PCT No.: PCT/EP2018/075640
§ 371 (c)(1),
(2) Date: Mar. 16, 2020

(87) PCT Pub. No.: WO2019/057912
PCT Pub. Date: Mar. 28, 2019

(65) Prior Publication Data
US 2020/0278014 A1  Sep. 3, 2020

(30) Foreign Application Priority Data

Sep. 21, 2017 (SE) ..................... 1751170-0

(51) Int. Cl.
*F16H 48/36* (2012.01)

(52) U.S. Cl.
CPC ....... *F16H 48/36* (2013.01); *F16H 2048/364* (2013.01)

(58) Field of Classification Search
CPC ........................... F16H 48/36; F16H 2048/364

USPC .................................................... 475/5, 150
See application file for complete search history.

(56) References Cited

U.S. PATENT DOCUMENTS

| 7,935,014 | B2 * | 5/2011 | Bachmann | B62D 11/04 |
| | | | | 475/5 |
| 9,428,042 | B2 * | 8/2016 | Morrow | B60K 6/543 |
| 9,636,988 | B2 * | 5/2017 | Pinschmidt | F16H 48/06 |
| 10,030,755 | B2 * | 7/2018 | Severinsson | B60K 6/48 |
| 10,316,946 | B2 * | 6/2019 | Sten | B60K 1/02 |
| 10,814,720 | B2 * | 10/2020 | Wang | B60K 1/02 |
| 2007/0123383 | A1 | 5/2007 | Yokoyama et al. | |
| 2019/0168603 | A1 * | 6/2019 | Nilsson | B60K 23/08 |

FOREIGN PATENT DOCUMENTS

| DE | 102006050599 A1 | 4/2008 |
| DE | 102012214766 A | 2/2014 |
| DE | 102015205101 A1 | 12/2015 |
| DE | 102014214326 A1 | 1/2016 |

(Continued)

*Primary Examiner* — Leslie A Nicholson, III
(74) *Attorney, Agent, or Firm* — BrooksGroup

(57) ABSTRACT

A torque vectoring device for a vehicle is provided, comprising an electrical motor (110) being connected to a differential mechanism (20) via a first planetary gear set (120) and a second planetary gear set (130), said planetary gear sets (120, 130) sharing a common ring wheel (126), wherein the first planetary gear set (120) is connecting the electrical motor (110) to a cage (22) of the differential (20), and the second planetary gear set (130) is connecting the electrical motor (110) to an output shaft (24), and wherein the rotational axis (R) of the first planetary gear set (120) and the second planetary gear set (130) is arranged remote from the output shaft (24).

11 Claims, 1 Drawing Sheet

(56) References Cited

FOREIGN PATENT DOCUMENTS

| | | | |
|---|---|---|---|
| JP | 2001039179 | A | 2/2001 |
| JP | 2007177915 | A | 7/2007 |
| JP | 2007232197 | A | 9/2007 |
| JP | 2007298138 | A | 11/2007 |
| JP | 2008064281 | A | 3/2008 |
| WO | 2015169837 | A1 | 11/2015 |
| WO | 2017178595 | A2 | 10/2017 |

* cited by examiner

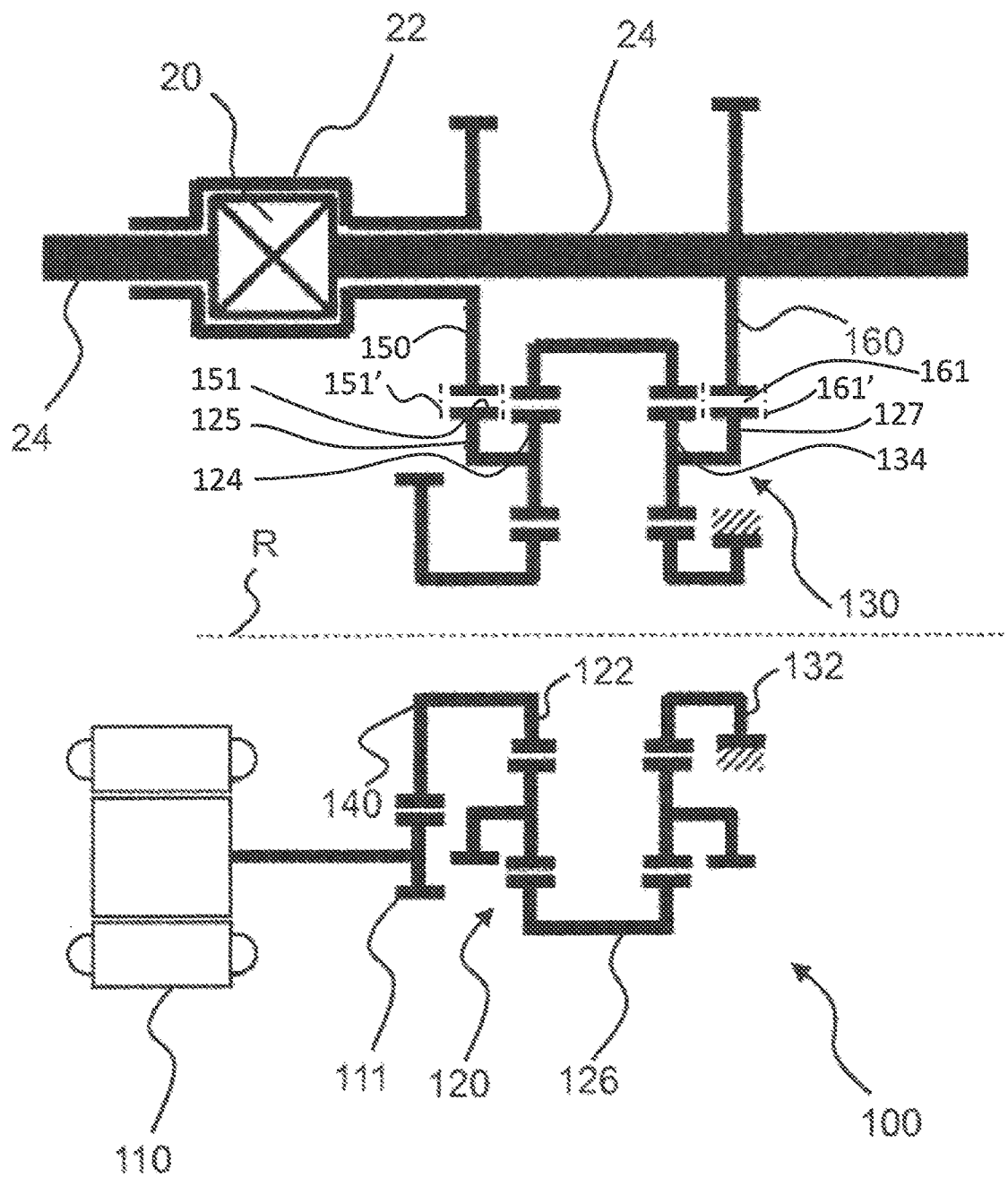

TORQUE VECTORING DEVICE

This application claims the benefit of Swedish Application No. 1751170-0 filed Sep. 21, 2017 and PCT Application No. EP2018/075640 filed Sep. 21, 2018.

TECHNICAL FIELD

The present invention relates to a torque vectoring device for distributing torque to the wheels of a vehicle. More specifically, the invention relates to a torque vectoring device comprising an electrical motor for distributing torque between the wheels of a front and/or a rear axle of a vehicle.

BACKGROUND

In modern four wheeled vehicles, such as cars, electrical motors may provide additional control of drive torque distribution by so called torque vectoring where the electrical motor controls a torque difference between output shafts from a differential. While the demands on safety systems in vehicles increase development of improved drive lines is necessary. As torque vectoring improves the driving characteristics of a vehicle, it is becoming increasingly more common that such a device is incorporated into the drive line of vehicle. To enable fitting of torque vectoring devices to more vehicles, the device needs to be improved by for instance reducing the required physical space of the device, by improving the durability and reducing the complexity of the device. Relevant background art can be found in US 20070123383 A1.

SUMMARY

It is an object of the teaching herein to provide a torque vectoring device which can alleviate some of the problems with prior art. It is also an object of the invention to provide a vehicle axle comprising said torque vectoring device and a vehicle using said axle which is improved over prior art. This object is achieved by a concept having the features set forth in the appended independent claims; preferred embodiments thereof being defined in the related dependent claims.

According to a first aspect of the teachings herein, a torque vectoring device for a vehicle is provided comprising an electrical motor being connected to a differential mechanism via a first planetary gear set and a second planetary gear set. The planetary gear set shares a common ring wheel. The first planetary gear set is connecting the electrical motor to a cage of the differential, and the second planetary gear set is connecting the electrical motor to an output shaft. The rotational axis of the first planetary gear set and the second planetary gear set is arranged remote from the output shaft. The remote arrangement of the rotational axes of the first and second planetary gear sets in relation to the output axis provides benefits in increasing the number of suitable applications for the torque vectoring device. By separating these can the physical space of the device be reduced, especially in the longitudinal direction of the output shaft. A further beneficial effect of the torque-vectoring device is that it achieves torque vectoring whilst reducing the complexity of the device, as well as the number of components therein. The number of engagements between gears in the device is kept low, increasing the overall efficiency of the device.

The connection between the first planetary gear set and the cage may be formed by a toothed gearing providing an efficient power transfer, as well as a large possible span of gear ratios.

In one embodiment, the connection between the first planetary gear set and the cage is formed by a chain drive or a belt drive, allowing a large separation between the first planetary gear set and the rotational axis of the cage.

The connection between the second planetary gear set and the output shaft may be formed by a toothed gearing providing an efficient power transfer, as well as a large possible span of gear ratios.

The connection between the second planetary gear set and the output shaft may be formed by a chain drive or a belt drive allowing a large separation between the second planetary gear set and the rotational axis of the cage.

In one embodiment, a pinion gear an output shaft of the electric motor is in engagement with a first reduction gear, the reduction gear rotating with a first sun gear of the first planetary gear set. The arrangement with a reduction gear between the first planetary gear set and the electric motor facilitates control of the torque vectoring, as the motor can run at a higher RPM and provide higher torque levels. The reduction gear also improves the accuracy of the control.

In one embodiment, a sun gear of the second planetary gear set is fixed. The connection between the first planetary gear set and the differential cage may be formed by a second reduction gear in engagement with a gear fixedly connected to and rotating coaxially with the planet gear of the first planetary gear set. The reduction gear being fixedly connected to and rotating coaxially with the differential cage.

The connection between the second planetary gear set and the output shaft may be formed by a third reduction gear in engagement with a gear fixedly connected to and rotating coaxially with the planet gear of the second planetary gear set, the reduction gear being fixedly connected to and rotating coaxially with the output shaft.

In a second aspect, a vehicle axle is provided comprising a torque vectoring device according to the first aspect. The physical space of the vehicle axle can thus be reduced whilst still providing torque vectoring.

In a third aspect is a vehicle provided, comprising a vehicle axle according to the second aspect. By reducing the space required for the vehicle axle, it is made possible to fit the axle into a larger variety of vehicles. As space is at a premium in the vehicles of today can the space saved be used for

BRIEF DESCRIPTION OF DRAWINGS

The invention will be described in further detail below with reference to the accompanying drawings, in which FIG. 1 shows a schematic cross-sectional view of a torque vectoring device according to an embodiment.

DETAILED DESCRIPTION

In FIG. 1, an embodiment of the torque vectoring device 100 is shown. The torque vectoring device is adapted to be fitted to an axle, front and/or rear, in a vehicle. The device provides the possibility of vectoring torque between the wheels of the vehicle for improved driving characteristics and safety when operating the vehicle. For instance, the torque vectoring device 100 may be arranged to intervene when it is detected that vehicle is in an over steer situation by altering the torque ratio between the left and right wheels of the rear axle of the vehicle. A control unit (not shown) may be arranged to detect sensor signals from wheel sensors or turn angle sensors etc and determine that active torque vectoring is required to improve handling and thus controlling the torque vectoring device accordingly. The control unit is arranged to control an electrical motor 110 of the torque vectoring device 100.

The torque vectoring device 100 shown in FIG. 1 comprises the electrical motor 110. The torque vectoring device 100 is further configured such that the electrical motor 110 is connected to a differential cage 22 as well as to one of the output shafts 24 of the differential 20, thus allowing the electrical motor 110 to control or vector the torque between these components.

The differential 20 may e.g. receive driving torque from a primary propulsion unit. The primary propulsion unit may be an internal combustion engine or a hybrid engine or an electric motor which is the prime means for propulsion of the vehicle. The torque is transferred from the engine optionally via a transmission (not shown) to the differential cage 22 and further to output shafts 24 of the differential 20. The output shafts 24 are connected to the front or rear wheels of the vehicle.

The electrical motor 110 connects to the cage 22 and to the output shaft 24 by means of two planetary gear sets 120, 130 which share a common ring wheel 126. The electrical motor 110 is driving a sun gear 122 of the first planetary gear set 120, and the planet gear 124 of the first planetary gear set 120 is connected to the cage 22.

The planet gear 134 of the second planetary gear set 130 is connected to the output shaft 24.

A first reduction gear 140 is provided between the electrical motor 110 and the two planetary gear sets 120, 130. The first reduction gear 140 is formed integrally with a sun gear 122 of the first planetary gear set 120 and thus rotates coaxially therewith. It is to be noted that the first reduction gear 140 does not have be made in one part with the first sun gear 122, they may simply be coupled to one another by a screw connection etc. The first reduction gear 140 preferably has a larger pitch diameter than that of the sun gear 122. The electrical motor 110 is preferably in engagement with the first reduction gear 140 by means of a pinion gear 111 arranged on the output shaft of the electrical motor 110.

A second and third reduction gear 150, 160 may be provided between the planetary gear sets 120, 130 and the cage 22/output shaft 24 respectively. The second reduction gear 150 is fixedly connected to and rotates coaxially with the differential cage 22, while the third reduction gear 160 is fixedly connected to and rotates coaxially with the output shaft 24.

The connection 151 between the planet gear 124 of the first planetary gear set 120 and the cage 22, forming a gear reduction, may e.g. be implemented using toothed gears as seen in FIG. 1 and/or belt or chain drives 151'. In the case of a toothed gear connection 151, the second reduction gear 150 is in engagement with a gear that is fixedly connected to and rotating coaxially with the planet gear 124 of the first planetary gear set 120.

The connection 161 between the planet gear 134 of the second planetary gear set 130 and the output shaft 24, forming a gear reduction, may e.g. be implemented using toothed gears as seen in FIG. 1 and/or belt or chain drives 161'. In the case of a toothed gear connection 161, the third reduction gear 160 is in engagement with a gear that is fixedly connected to and rotating coaxially with the planet gear 134 of the second planetary gear set 130.

Using belt or chain connections 151', 161' between the first and/or second planetary gear sets 120, 130 and the differential cage 22 and/or the output shaft 24 respectively will allow a greater axial separation between the components. This may be beneficial in certain applications where for instance adjacent components require the space otherwise occupied by the torque-vectoring device, and where toothed gears are unable to provide enough axial separation or for other reasons are deemed unsuitable.

The rotational axis R of the first and second planetary gear sets 120, 130 is thus arranged remote from the output shaft 24 of the differential 20. By having the electrical motor 110, as well as the planetary gear sets 120, 130, arranged non-coaxially at the output shaft a more flexible packing is possible.

It should be mentioned that the inventive concept is by no means limited to the embodiments described herein, and several modifications are feasible without departing from the scope of the invention as defined in the appended claims.

In an embodiment, the connection between the first planetary gear set and the differential cage is formed by a second reduction gear in engagement with a gear 125 fixedly connected to and rotating coaxially with the planet gear of the first planetary gear set, the reduction gear being fixedly connected to and rotating coaxially with the differential cage.

In an embodiment, the connection between the second planetary gear set and the output shaft is formed by a third reduction gear in engagement with a gear 127 fixedly connected to and rotating coaxially with the planet gear of the second planetary gear set, the reduction gear being fixedly connected to and rotating coaxially with the output shaft.

The invention claimed is:

1. A torque vectoring device for a vehicle, comprising an electrical motor being connected to a differential mechanism via a first planetary gear set and a second planetary gear set, said planetary gear sets sharing a common ring wheel, wherein the first planetary gear set is connecting the electrical motor to a cage of the differential, and the second planetary gear set is connecting the electrical motor to an output shaft, and wherein the rotational axis (R) of the first planetary gear set and the second planetary gear set is arranged remote from the output shaft.

2. The torque vectoring device according to claim 1, wherein the connection between the first planetary gear set and the cage is formed by a toothed gearing.

3. The torque vectoring device according to claim 1, wherein the connection between the first planetary gear set and the cage is formed by a chain drive or a belt drive.

4. The torque vectoring device according to claim 1, wherein the connection between the second planetary gear set and the output shaft is formed by a toothed gearing.

5. The torque vectoring device according to claim 1, wherein the connection between the second planetary gear set and the output shaft is formed by a chain drive or a belt drive.

6. The torque vectoring device according to claim 1, wherein a pinion gear on an output shaft of the electric motor is in engagement with a first reduction gear, the reduction gear rotating with a first sun gear of the first planetary gear set.

7. The torque vectoring device according claim 1, wherein a sun gear of the second planetary gear set is fixed.

8. The torque vectoring device according to claim 2, wherein the connection between the first planetary gear set and the differential cage is formed by a second reduction gear in engagement with a gear fixedly connected to and rotating coaxially with the planet gear of the first planetary gear set, the reduction gear being fixedly connected to and rotating coaxially with the differential cage.

9. The torque vectoring device according to claim 4, wherein the connection between the second planetary gear set and the output shaft is formed by a third reduction gear in engagement with a gear fixedly connected to and rotating coaxially with the planet gear of the second planetary gear set, the reduction gear being fixedly connected to and rotating coaxially with the output shaft.

10. A vehicle axle, comprising a torque vectoring device comprising an electrical motor being connected to a differential mechanism via a first planetary gear set and a second planetary gear set, said planetary gear sets sharing a common ring wheel, wherein
   the first planetary gear set is connecting the electrical motor to a cage of the differential, and the second planetary gear set is connecting the electrical motor to an output shaft, and wherein the rotational axis (R) of the first planetary gear set and the second planetary gear set is arranged remote from the output shaft.

11. A vehicle, comprising a vehicle axle comprising a torque vectoring device comprising an electrical motor being connected to a differential mechanism via a first planetary gear set and a second planetary gear set, said planetary gear sets sharing a common ring wheel, wherein
   the first planetary gear set is connecting the electrical motor to a cage of the differential, and the second planetary gear set is connecting the electrical motor to an output shaft, and wherein the rotational axis (R) of the first planetary gear set and the second planetary gear set is arranged remote from the output shaft.

* * * * *